(12) United States Patent
Lin et al.

(10) Patent No.: US 12,301,978 B2
(45) Date of Patent: May 13, 2025

(54) ALGORITHM CALLING METHOD AND ALGORITHM CALLING APPARATUS

(71) Applicant: HONOR DEVICE CO., LTD., Guangdong (CN)

(72) Inventors: Mengran Lin, Shenzhen (CN); Tao Shao, Shenzhen (CN); Jirun Xu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/044,818

(22) PCT Filed: Aug. 30, 2022

(86) PCT No.: PCT/CN2022/115889
§ 371 (c)(1),
(2) Date: Mar. 10, 2023

(87) PCT Pub. No.: WO2023/045719
PCT Pub. Date: Mar. 30, 2023

(65) Prior Publication Data
US 2024/0292081 A1 Aug. 29, 2024

(30) Foreign Application Priority Data
Sep. 27, 2021 (CN) .......................... 202111138674.4

(51) Int. Cl.
*H04N 23/617* (2023.01)
*H04N 23/67* (2023.01)
(Continued)

(52) U.S. Cl.
CPC ........... *H04N 23/617* (2023.01); *H04N 23/67* (2023.01); *H04N 23/73* (2023.01); *H04N 23/88* (2023.01)

(58) Field of Classification Search
CPC ...... H04N 23/617; H04N 23/67; H04N 23/73; H04N 23/88; H04N 9/73; H04N 23/70
See application file for complete search history.

(56) References Cited

U.S. PATENT DOCUMENTS 8,837,576 B2 * 9/2014 Liang .................. H04N 19/107
375/240
9,591,195 B2 3/2017 Nikkanen et al.
(Continued)

FOREIGN PATENT DOCUMENTS

CN 103458173 A 12/2013
CN 104580895 A 4/2015
(Continued)

OTHER PUBLICATIONS

Li et al., "Research on camera development technology based on Android platform," Computer Knowledge and Technology, vol. 13, No. 9, Mar. 2017, 9 pages (with English translation).

*Primary Examiner* — Ahmed A Berhan
(74) *Attorney, Agent, or Firm* — Fish & Richardson P.C.

(57) ABSTRACT

An algorithm calling method and an algorithm calling apparatus are provided. The algorithm calling method includes: The control module sends a first instruction to the fusion module, where the first instruction is used to indicate a to-be-called target algorithm in an auto focus algorithm, an auto exposure algorithm, and an auto white balance algorithm; the fusion module determines a fusion policy according to the first instruction, where the fusion policy is used to call an algorithm in the first algorithm library and/or the second algorithm library; and the fusion module sends a second instruction to the first algorithm library and/or the second algorithm library according to the fusion policy, where the second instruction is used to call the target algorithm. Based on the technical method in this application, (Continued)

decoupling between a control module and an algorithm can be implemented, and maintenance efficiency of an electronic device can be improved.

14 Claims, 13 Drawing Sheets

(51) Int. Cl.
*H04N 23/73* (2023.01)
*H04N 23/88* (2023.01)

(56) References Cited

U.S. PATENT DOCUMENTS

| | | | |
|---|---|---|---|
| 2012/0050567 | A1 | 3/2012 | Cote et al. |
| 2016/0014312 | A1* | 1/2016 | Nikkanen .............. H04N 23/80 |
| | | | 348/222.1 |
| 2017/0099444 | A1 | 4/2017 | Park et al. |
| 2018/0197282 | A1 | 7/2018 | Guichard et al. |

FOREIGN PATENT DOCUMENTS

| | | |
|---|---|---|
| CN | 106471797 A | 3/2017 |
| CN | 106791470 A | 5/2017 |
| CN | 110958399 A | 4/2020 |
| CN | 111414885 A | 7/2020 |
| CN | 112330519 A | 2/2021 |
| CN | 113377448 A | 9/2021 |
| CN | 113852762 A | 12/2021 |
| JP | 2019013268 A | 1/2019 |
| WO | 2016007229 A1 | 1/2016 |
| WO | 2017145249 A1 | 8/2017 |

* cited by examiner

ALGORITHM CALLING METHOD AND ALGORITHM CALLING APPARATUS

CROSS-REFERENCE TO RELATED APPLICATIONS

This application is a national stage of International Application No. PCT/CN2022/115889, filed on Aug. 30, 2022, which claims priority to Chinese Patent Application No. 202111138674.4, filed on Sep. 27, 2021. The disclosures of the aforementioned applications are hereby incorporated by reference in their entireties.

TECHNICAL FIELD

This application relates to the field of terminals, and specifically, to an algorithm calling method and an algorithm calling apparatus.

BACKGROUND

A 3A algorithm is a general term of an auto focus (auto focus, AF) algorithm, an auto exposure (auto exposure, AE) algorithm, and an auto white balance (auto white balance, AWB) algorithm. When an electronic device performs the 3A algorithm, a control module (processor) may control running of an algorithm (core) in an algorithm module, and provide a context of algorithm (core) running. Because the algorithm in the algorithm module is invisible to a user, when some algorithms are newly added to the electronic device, the control module needs to be modified to write the newly added algorithm into the control module, so that the control module is coupled to the algorithm module. However, with continuous iteration and upgrade of the electronic device, maintenance efficiency of the electronic device is greatly reduced because the control module and the algorithm module are highly coupled.

Therefore, how to decouple a control module from an algorithm module to improve maintenance efficiency of an electronic device becomes a problem to be urgently resolved.

SUMMARY

This application provides an algorithm calling method and an algorithm calling apparatus. According to the algorithm calling method in this application, decoupling between a control module and an algorithm can be implemented, to improve maintenance efficiency of an electronic device.

According to a first aspect, an algorithm calling method is provided. The algorithm calling method is applied to a system architecture, and the system architecture includes a first algorithm library, a second algorithm library, a control module, and a fusion module. The first algorithm library and the second algorithm library are configured to store different 3A algorithms, the first algorithm library and the second algorithm library are disposed in a camera algorithm library, the camera algorithm library is disposed at a hardware abstraction layer, and the 3A algorithm includes an auto focus algorithm, an auto exposure algorithm, or an auto white balance algorithm. The control module is configured to call any one of the auto focus algorithm, the auto exposure algorithm, or the auto white balance algorithm, and the fusion module is configured to call an algorithm in the first algorithm library and/or the second algorithm library. The algorithm calling method includes:

the control module sends a first instruction to the fusion module, where the first instruction is used to indicate a to-be-called target algorithm in the auto focus algorithm, the auto exposure algorithm, or the auto white balance algorithm;

the fusion module determines a fusion policy according to the first instruction, where the fusion policy is used to call an algorithm in the first algorithm library and/or the second algorithm library; and the fusion module sends a second instruction to the first algorithm library and/or the second algorithm library according to the fusion policy, where the second instruction is used to call the target algorithm.

In this embodiment of this application, the control module may send the first instruction to the fusion module, and the first instruction is used to indicate the to-be-called target algorithm in the 3A algorithm. The fusion module may determine the call policy according to the first instruction, the fusion policy is used to call an algorithm in the first algorithm library and/or the second algorithm library, and the first algorithm library and the second algorithm library may be configured to store different 3A algorithms. The fusion module may send the second instruction to the first algorithm library and/or the second algorithm library according to the call policy, and the second instruction is used to call the target algorithm. In this embodiment of this application, an original 3A algorithm of an electronic device may be stored in the first algorithm library, and a newly added 3A algorithm may be stored in the second algorithm library. The newly added 3A algorithm may be a self-developed 3A algorithm or an algorithm obtained by supplementing and enhancing the original 3A algorithm. Therefore, compared with the conventional technology, in this embodiment of this application, when a 3A algorithm is newly added to the electronic device, the control module may not need to be modified, and the newly added 3A algorithm may be stored in the second algorithm library. This implements decoupling between the control module and the algorithm, and improves maintenance efficiency of the electronic device.

In a possible implementation, the first instruction may be an instruction for calling the auto focus algorithm, or the first instruction may be an instruction for calling the auto exposure algorithm, or the first instruction is an instruction for calling the auto white balance algorithm.

With reference to the first aspect, in some implementations of the first aspect, the method further includes:

the fusion module obtains photographing status information, where the photographing status information is used to indicate a photographing status of an electronic device; and that the fusion module determines a fusion policy according to the first instruction includes:

the fusion module determines the call policy according to the first instruction and the photographing status information.

In this embodiment of this application, different 3A algorithm call policies may be determined based on the current photographing status information of the electronic device, so that the 3A algorithms can be flexibly called based on characteristics of algorithms in the first algorithm library and the second algorithm library.

With reference to the first aspect, in some implementations of the first aspect, that the fusion module determines the call policy according to the first instruction and the photographing status information includes:

the fusion module determines a first weight value and a second weight value based on the photographing status information, where the first weight value is a weight value of the target algorithm in the first algorithm library, and the second weight value is a weight value of the target algorithm in the second algorithm library.

In a possible implementation, the to-be-called target algorithm may be determined according to the first instruction. The target algorithm may be any one of the auto focus algorithm, the auto exposure algorithm, or the auto white balance algorithm. The first weight value and the second weight value are determined based on the photographing status information of the electronic device, the first weight value is a weight value of the target algorithm in the first algorithm library, and the second weight value is a weight value of the target algorithm in the second algorithm library. Target algorithms in the first algorithm library and the second algorithm library may be cooperatively called based on the first weight value and the second weight value.

With reference to the first aspect, in some implementations of the first aspect, the photographing status information includes status information of auto focus and status information of auto exposure.

In a possible implementation, the first algorithm library may be an original 3A algorithm library, and the second algorithm library may be a newly added 3A algorithm library. An auto focus algorithm included in the original 3A algorithm library is a first auto focus algorithm, and an auto focus algorithm included in the newly added 3A algorithm library is a second auto focus algorithm. When the photographing status information of the electronic device indicates that the electronic device is in a focusing state, a first weight value of the first auto focus algorithm and a second weight value of the second auto focus algorithm may be determined. Alternatively, when the photographing status information of the electronic device indicates that the electronic device is in a state in which focusing ends, a first weight value of the first auto focus algorithm and a second weight value of the second auto focus algorithm may be determined.

With reference to the first aspect, in some implementations of the first aspect, the status information of the auto focus includes that auto focus is being performed or auto focus ends.

With reference to the first aspect, in some implementations of the first aspect, the status information of the auto exposure includes that auto exposure is being performed or auto exposure ends.

With reference to the first aspect, in some implementations of the first aspect, the second algorithm library obtains, by using an integration module, data required for running an algorithm, and the integration module is configured to manage input/output data of the second algorithm library.

According to a second aspect, an algorithm calling apparatus is provided, including a control module and a fusion module.

The control module is configured to send a first instruction to the fusion module, where the first instruction is used to indicate a to-be-called target algorithm in an auto focus algorithm, an auto exposure algorithm, or an auto white balance algorithm.

The fusion module is configured to: determine a fusion policy according to the first instruction, where the fusion policy is used to call an algorithm in a first algorithm library and/or a second algorithm library, the first algorithm library and the second algorithm library are configured to store different 3A algorithms, the first algorithm library and the second algorithm library are disposed in a camera algorithm library, the camera algorithm library is disposed at a hardware abstraction layer, and the 3A algorithm includes an auto focus algorithm, an auto exposure algorithm, or an auto white balance algorithm; and send a second instruction to the first algorithm library and/or the second algorithm library according to the fusion policy, where the second instruction is used to call the target algorithm.

With reference to the second aspect, in some implementations of the second aspect, the fusion module is configured to:
  obtain photographing status information, where the photographing status information is used to indicate a photographing status of an electronic device; and
  determine the call policy according to the first instruction and the photographing status information.

With reference to the second aspect, in some implementations of the second aspect, the fusion module is configured to:
  determine a first weight value and a second weight value based on the photographing status information, where the first weight value is a weight value of the target algorithm in the first algorithm library, and the second weight value is a weight value of the target algorithm in the second algorithm library.

With reference to the second aspect, in some implementations of the second aspect, the photographing status information includes status information of auto focus and status information of auto exposure.

With reference to the second aspect, in some implementations of the second aspect, the status information of the auto focus includes that auto focus is being performed or auto focus ends.

With reference to the second aspect, in some implementations of the second aspect, the status information of the auto exposure includes that auto exposure is being performed or auto exposure ends.

With reference to the second aspect, in some implementations of the second aspect, the second algorithm library obtains, by using an integration module, a context of running the target algorithm, and the integration module is configured to manage input/output data of the second algorithm library.

According to a third aspect, an electronic device is provided. The electronic device includes one or more processors, a memory, and a display. The memory is coupled to the one or more processors. The memory is configured to store computer program code. The computer program code includes computer instructions. The one or more processors invoke the computer instructions to enable the electronic device to perform the following operations;
  sending a first instruction, where the first instruction is used to indicate a to-be-called target algorithm in an auto focus algorithm, an auto exposure algorithm, or an auto white balance algorithm; determining a fusion policy according to the first instruction, where the fusion policy is used to call an algorithm in a first algorithm library and/or a second algorithm library, the first algorithm library and the second algorithm library are configured to store different 3A algorithms, the first algorithm library and the second algorithm library are disposed in a camera algorithm library, the camera algorithm library is disposed at a hardware abstraction layer, and the 3A algorithm includes an auto focus algorithm, an auto exposure algorithm, or an auto white balance algorithm, and sending a second instruction to the first algorithm library and/or the second algorithm library according to the fusion policy, where the second instruction is used to call the target algorithm.

With reference to the third aspect, in some implementations of the third aspect, the one or more processors invoke the computer instructions to enable the electronic device to perform the following operations:

obtaining photographing status information, where the photographing status information is used to indicate a photographing status of the electronic device; and determining the call policy according to the first instruction and the photographing status information.

With reference to the third aspect, in some implementations of the third aspect, the one or more processors invoke the computer instructions to enable the electronic device to perform the following operation:

determining a first weight value and a second weight value based on the photographing status information, where the first weight value is a weight value of the target algorithm in the first algorithm library, and the second weight value is a weight value of the target algorithm in the second algorithm library.

With reference to the third aspect, in some implementations of the third aspect, the photographing status information includes status information of auto focus and status information of auto exposure.

With reference to the third aspect, in some implementations of the third aspect, the status information of the auto focus includes that auto focus is being performed or auto focus ends.

With reference to the third aspect, in some implementations of the third aspect, the status information of the auto exposure includes that auto exposure is being performed or auto exposure ends.

With reference to the third aspect, in some implementations of the third aspect, the second algorithm library obtains, by using an integration module, a context of running the target algorithm, and the integration module is configured to manage input/output data of the second algorithm library.

According to a fourth aspect, an algorithm calling apparatus is provided. The algorithm calling apparatus includes one or more processors, a memory, and a display. The memory is coupled to the one or more processors. The memory is configured to store computer program code. The computer program code includes computer instructions. The one or more processors invoke the computer instructions to enable the algorithm calling apparatus to perform any algorithm calling method in the first aspect.

According to a fifth aspect, a chip system is provided. The chip system is applied to an electronic device, the chip system includes one or more processors, and the processor is configured to invoke computer instructions to enable the electronic device to perform any algorithm calling method in the first aspect.

According to a sixth aspect, a computer-readable storage medium is provided. The computer-readable storage medium stores computer program code. When the computer program code is run by an electronic device, the electronic device is enabled to perform any algorithm calling method in the first aspect.

According to a seventh aspect, a computer program product is provided. The computer program product includes computer program code. When the computer program code is run by an electronic device, the electronic device is enabled to perform any algorithm calling method in the first aspect.

In embodiments of this application, the control module may send the first instruction to the fusion module, and the first instruction is used to indicate the to-be-called target algorithm in the 3A algorithm. The fusion module may determine the call policy according to the first instruction, the fusion policy is used to call an algorithm in the first algorithm library and/or the second algorithm library, and the first algorithm library and the second algorithm library may be configured to store different 3A algorithms. The fusion module may send the second instruction to the first algorithm library and/or the second algorithm library according to the call policy, and the second instruction is used to call the target algorithm. In embodiments of this application, an original 3A algorithm of an electronic device may be stored in the first algorithm library, and a newly added 3A algorithm may be stored in the second algorithm library. The newly added 3A algorithm may be a self-developed 3A algorithm or an algorithm obtained by supplementing and enhancing the original 3A algorithm. Therefore, compared with the conventional technology, in embodiments of this application, when a 3A algorithm is newly added to the electronic device, the control module may not need to be modified, and the newly added 3A algorithm may be stored in the second algorithm library. This implements decoupling between the control module and the algorithm, and improves maintenance efficiency of the electronic device.

DESCRIPTION OF EMBODIMENTS

The following describes the technical solutions in embodiments of this application with reference to the accompanying drawings.

Figure 1:
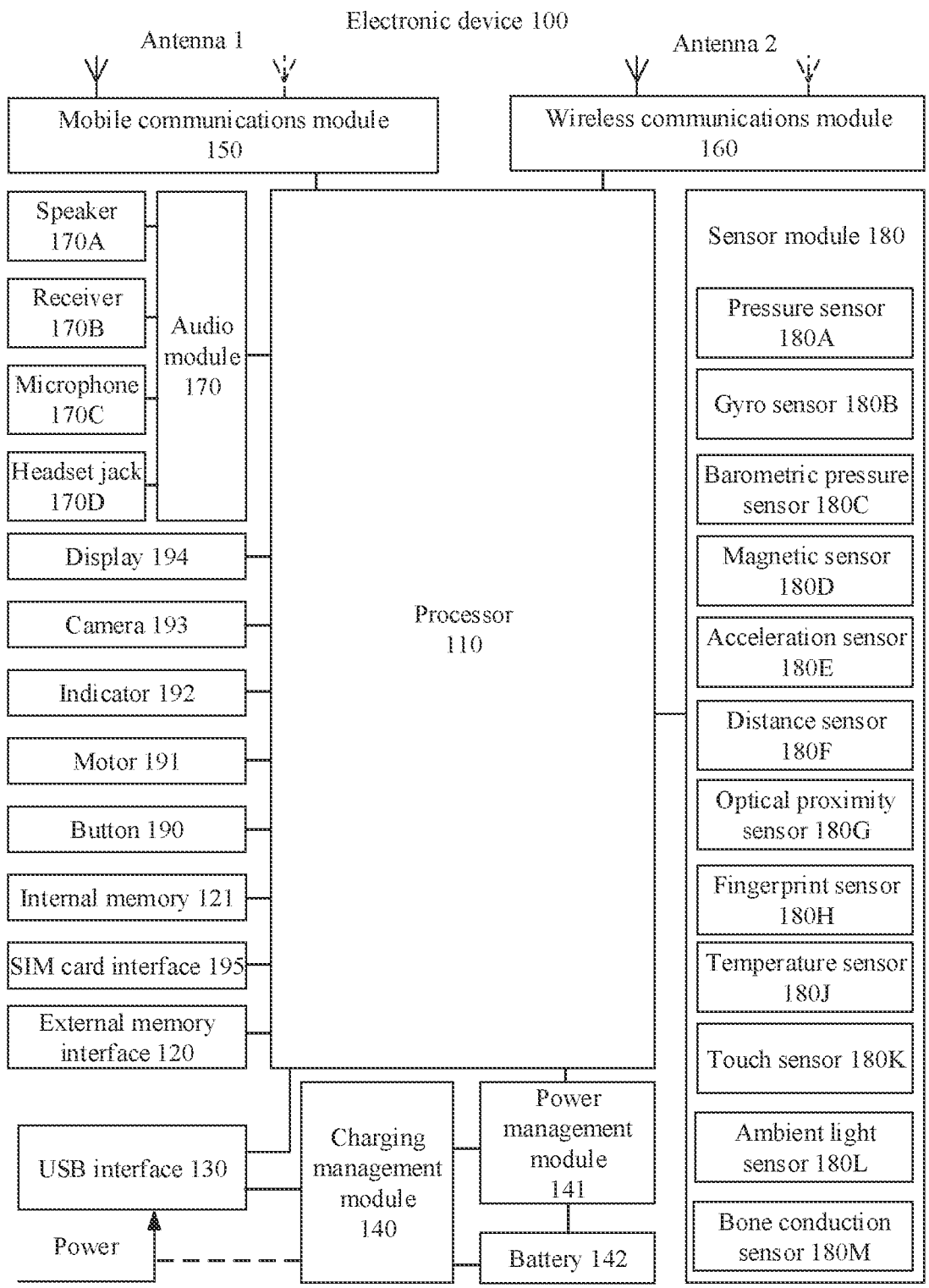
FIG. 1 is a schematic diagram of a hardware system of an electronic device applicable to this application.

FIG. 1 shows a hardware system of an apparatus applicable to this application.

An electronic device 100 may be a mobile phone, a smart screen, a tablet computer, a wearable electronic device, a vehicle-mounted electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the electronic device 100 is not limited in embodiments of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that the structure shown in FIG. 1 does not constitute a specific limitation on the electronic device 100. In some other embodiments of this application, the electronic device 100 may include more or fewer components than the components shown in FIG. 1, or the electronic device 100 may include a combination of some components in the components shown in FIG. 1, or the electronic device 100 may include sub-components of some components in the components shown in FIG. 1. The components shown in FIG. 1 may be implemented by hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and a neural-network processing unit (neural-network processing unit, NPU). Different processing units may be independent components, or may be an integrated component.

For example, in this embodiment of this application, the processor 110 may send a first instruction, where the first instruction is used to indicate a to-be-called target algorithm in an auto focus algorithm, an auto exposure algorithm, or an auto white balance algorithm; determine a fusion policy according to the first instruction, where the fusion policy is used to call an algorithm in a first algorithm library and/or a second algorithm library, the first algorithm library and the second algorithm library are configured to store different 3A algorithms, the first algorithm library and the second algorithm library are disposed in a camera algorithm library, the camera algorithm library is disposed at a hardware abstraction layer, and the 3A algorithm includes an auto focus algorithm, an auto exposure algorithm, or an auto white balance algorithm; and send a second instruction to the first algorithm library and/or the second algorithm library according to the fusion policy, where the second instruction is used to call the target algorithm.

The controller may generate an operation control signal based on instruction operation code and a time sequence signal, to complete control of instruction fetching and instruction execution.

A memory may further be disposed in the processor 110, to store instructions and data. In some embodiments, the memory in the processor 110 is a cache. The memory may store instructions or data just used or cyclically used by the processor 110. If the processor 110 needs to use the instructions or data again, the instructions or data may be directly invoked from the memory. This avoids repeated access, and reduces waiting time of the processor 110, so that system efficiency is improved.

The connection relationship between the modules shown in FIG. 1 is merely a schematic description, and does not constitute a limitation on the connection relationship between the modules of the electronic device 100. Optionally, the modules of the electronic device 100 may alternatively use a combination of a plurality of connection manners in the foregoing embodiment.

The electronic device 100 may implement a display function by using the GPU, the display 194, and the application processor. The GPU is a microprocessor for image processing, and is connected to the display 194 and the application processor. The GPU is configured to perform mathematical and geometric calculation and render graphics. The processor 110 may include one or more GPUs that execute program instructions to generate or change display information.

The display 194 may be configured to display an image or a video.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may perform algorithm optimization on noise, brightness, and a color of an image, and the ISP may further optimize parameters such as exposure and a color temperature in a photographing scenario.

The camera 193 is configured to capture a still image or a video. An optical image of an object is generated by using a lens and projected onto a photosensitive element. The photosensitive element may be a charge coupled device (charge coupled device. CCD) or a complementary metal-oxide-semiconductor (complementary metal-oxide-semiconductor, CMOS) phototransistor. The photosensitive element converts an optical signal into an electrical signal, and then transmits the electrical signal to the ISP for conversion into a digital image signal. The ISP outputs the digital image signal to the DSP for processing. The DSP converts the digital image signal into a standard image signal in a format such as red green blue (red green blue, RGB) or YUV. In some embodiments, the electronic device 100 may include one or N cameras 193, where N is a positive integer greater than 1.

The digital signal processor is configured to process a digital signal. In addition to processing the digital image signal, the digital signal processor may further process another digital signal. The distance sensor 180F is configured to measure a distance. The electronic device 100 may measure a distance through infrared or laser. In some embodiments, for example, in a photographing scenario, the electronic device 100 may measure a distance by using the distance sensor 180F, to implement quick focusing.

The optical proximity sensor 180G may include, for example, a light-emitting diode (light-emitting diode, LED) and a photodetector, for example, a photodiode. The LED may be an infrared LED. The electronic device 100 may emit infrared light outward by using the LED.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to prevent an accidental touch.

The foregoing describes in detail the hardware system of the electronic device 100. The following describes a software system of the electronic device 100.

Figure 2:
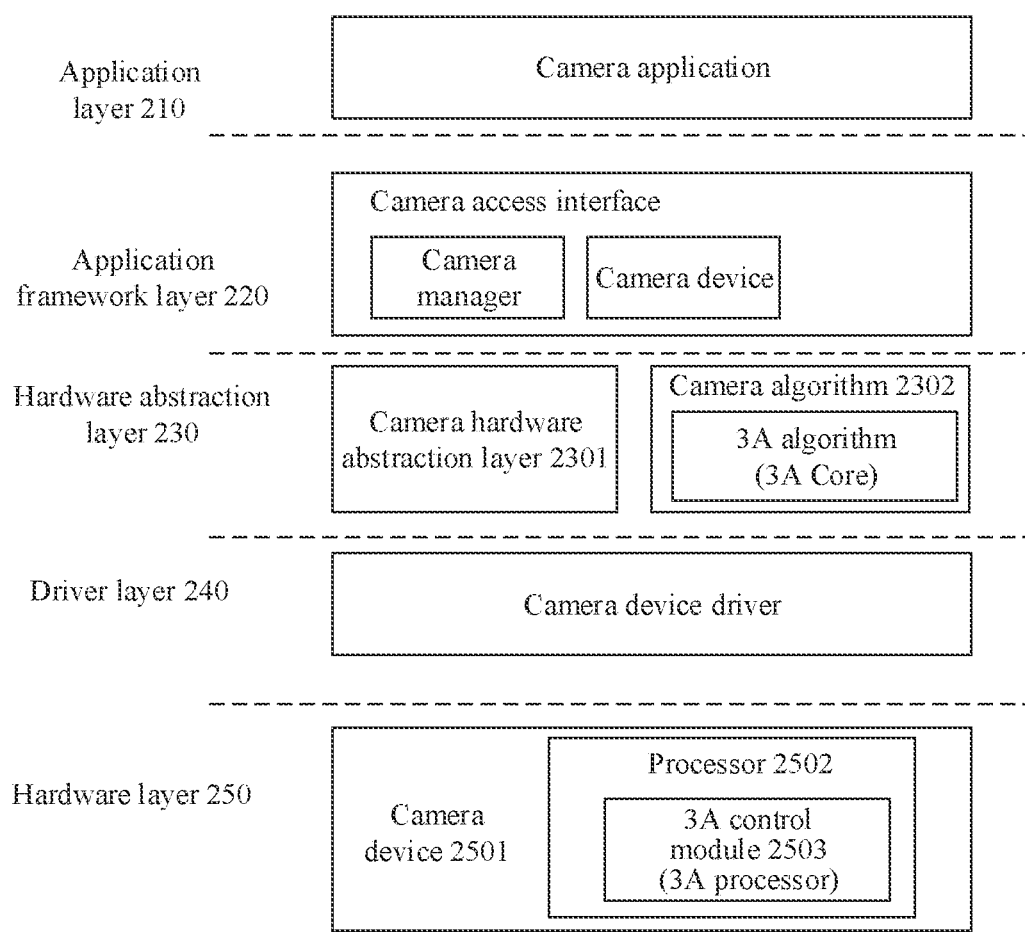
FIG. 2 is a schematic diagram of a software system of an electronic device applicable to this application.

FIG. 2 is a schematic diagram of a software system according to an embodiment of this application.

As shown in FIG. 2, a system architecture may include an application layer 210, an application framework layer 220, a hardware abstraction layer 230, a driver layer 240, and a hardware layer 250.

The application layer 210 may include applications such as Camera, Gallery, Calendar, Phone, Map, Navigation, WLAN, Bluetooth, Music, Video, and Messages.

The application framework layer 220 provides an application programming interface (application programming interface, API) and a programming framework for the application at the application layer. The application framework layer may include some predefined functions.

For example, the application framework layer 220 may include a camera access interface. The camera access interface may include a camera manager and a camera device. The camera manager may be configured to provide an access interface for managing a camera. The camera device may be configured to provide an interface for accessing the camera.

The hardware abstraction layer 230 is configured to abstract hardware. For example, the hardware abstraction layer may include a camera abstraction layer and another hardware device abstraction layer. The camera hardware abstraction layer may invoke a camera algorithm.

For example, the hardware abstraction layer 230 includes a camera hardware abstraction layer 2301 and a camera algorithm 2302. The camera algorithm 2302 includes a 3A algorithm (3A Core). The 3A algorithm may include an original 3A algorithm library (an example of a first algorithm library) and a newly added 3A algorithm library (an example of a second algorithm library).

The driver layer 240 is configured to provide drivers for different hardware devices. For example, the driver layer may include a camera driver.

The hardware layer 250 may include a camera device and another hardware device.

For example, the hardware layer 250 includes a camera device 2501. The camera device 2501 includes a processor 2502. The processor 2502 includes a 3A control module 2503 (3A processor), and the 3A control module 2503 is configured to call a 3A algorithm in a camera algorithm library. The 3A algorithm includes an auto focus algorithm, an auto exposure algorithm, or an auto white balance algorithm. An image obtained by the camera device may be processed by using the 3A algorithm.

Figure 3:
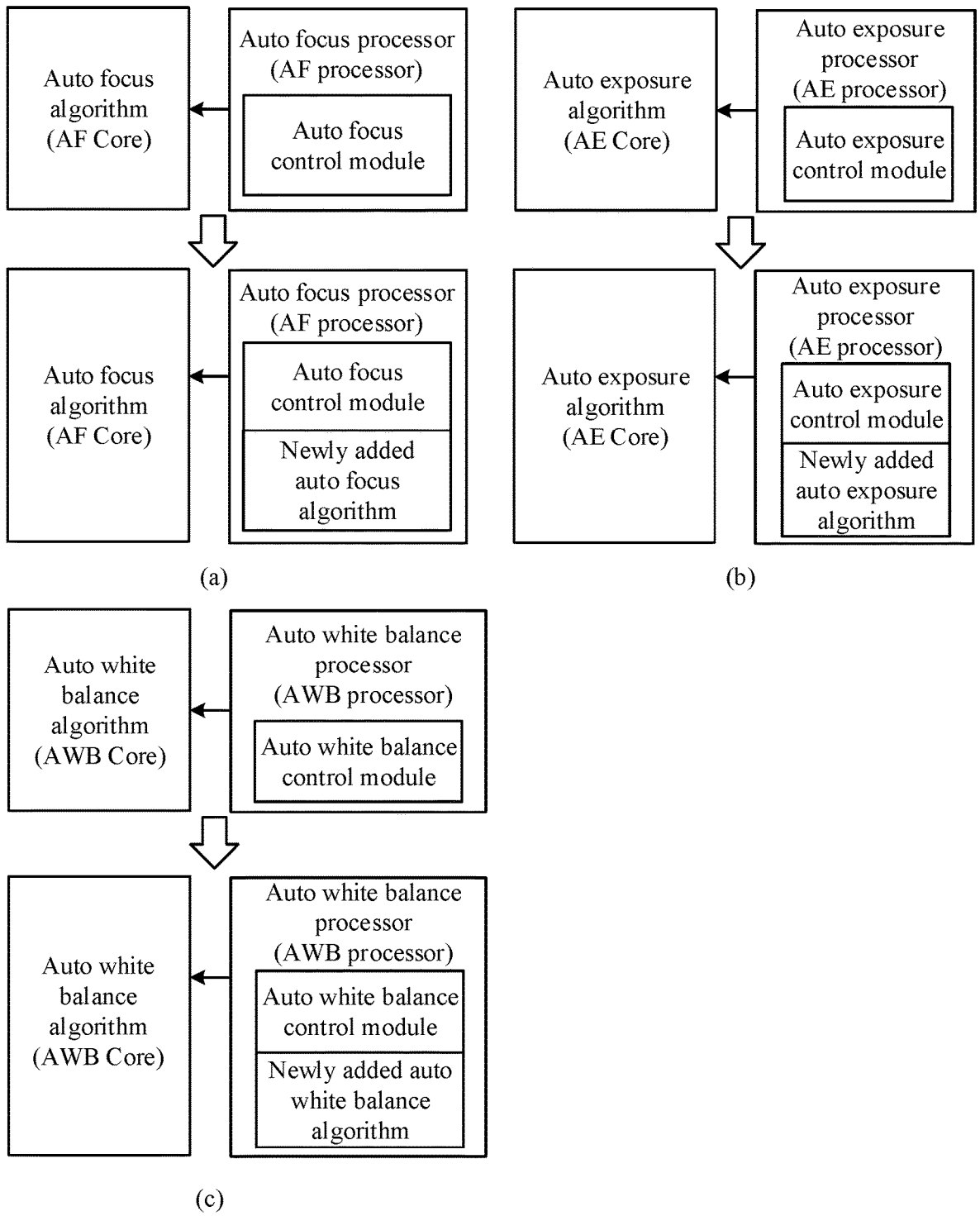
FIG. 3 is a schematic diagram of a system architecture of an existing 3A algorithm.

FIG. 3 is a schematic diagram of an existing architecture of a 3A algorithm.

For example, a processor may include a control module, and the control module may call a corresponding 3A algorithm. For example, as shown in (a) in FIG. 3, an auto focus processor includes an auto focus control module, and the auto focus control module may control running of an auto focus algorithm. As shown in (b) in FIG. 3, an auto exposure processor may include an auto exposure control module, and the auto exposure control module may control running of an auto exposure algorithm. As shown in (c) in FIG. 3, an auto white balance processor may include an auto white balance control module, and the auto white balance control module may control running of an auto white balance algorithm. For example, some 3A algorithms are newly added to an electronic device, and the newly added 3A algorithm may be a self-developed 3A algorithm or an algorithm obtained by supplementing and enhancing an original 3A algorithm. Because an algorithm in an algorithm module is invisible to a user, when some 3A algorithms need to be newly added to the electronic device, a control module (processor) is inevitably modified, to enable the control module to undertake an algorithm function.

FIG. 3 is a schematic diagram of an architecture of an existing 3A algorithm. Because a new algorithm (a new 3A algorithm) is written into the control module, a boundary between the control module and the algorithm is blurred. Consequently, algorithm development and software development are highly coupled, and maintenance efficiency of the electronic device is reduced.

In view of this, this application provides an algorithm calling method. In embodiments of this application, a control module may send a first instruction to a fusion module, and the first instruction is used to indicate a to-be-called target algorithm in a 3A algorithm. The fusion module may determine a call policy according to the first instruction, the fusion policy is used to call an algorithm in a first algorithm library and/or a second algorithm library, and the first algorithm library and the second algorithm library may be configured to store different 3A algorithms. The fusion module may send a second instruction to the first algorithm library and/or the second algorithm library according to the call policy, and the second instruction is used to call the target algorithm. In embodiments of this application, an original 3A algorithm of an electronic device may be stored in the first algorithm library, and a newly added 3A algorithm may be stored in the second algorithm library. The newly added 3A algorithm may be a self-developed 3A algorithm or an algorithm obtained by supplementing and enhancing the original 3A algorithm. Therefore, compared with the conventional technology, in embodiments of this application, when a 3A algorithm is newly added to the electronic device, the control module may not need to be modified, and the newly added 3A algorithm may be stored in the second algorithm library. This implements decoupling between the control module and the algorithm, and improves maintenance efficiency of the electronic device.

Figure 4:
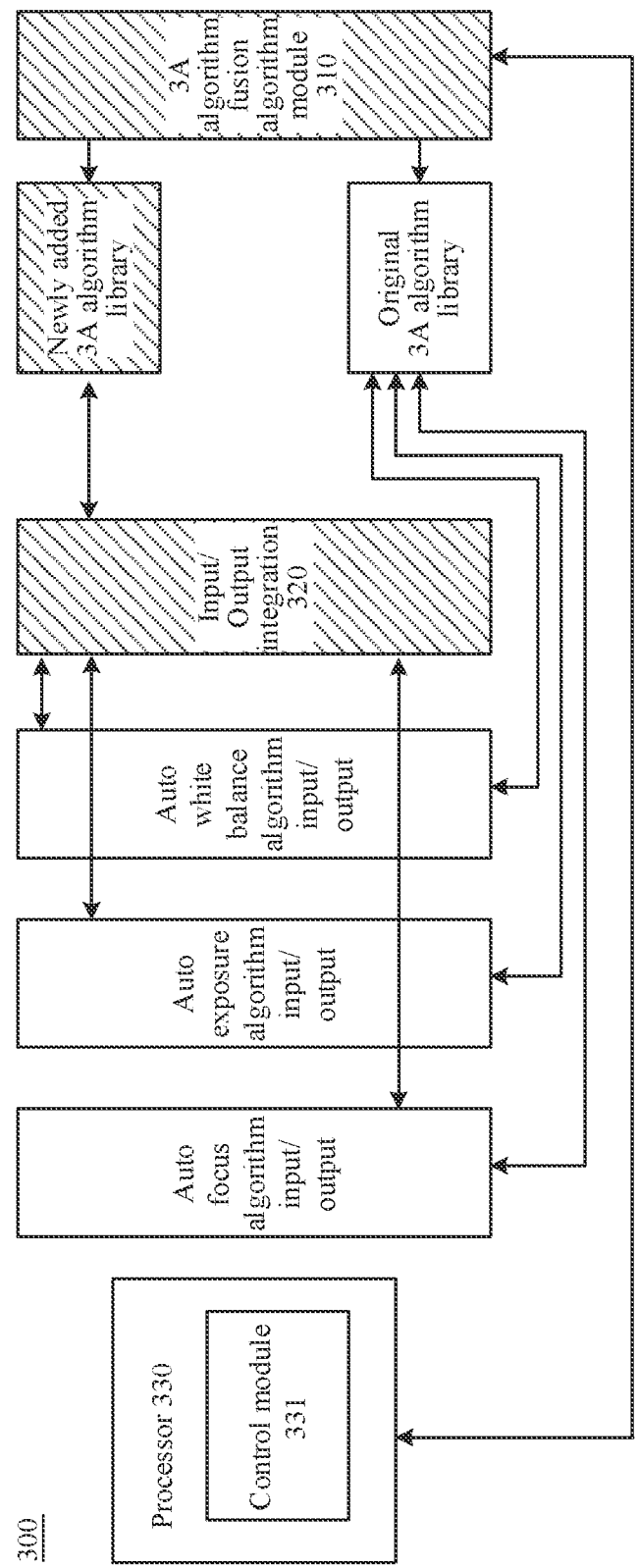
FIG. 4 is a schematic diagram of a system architecture of an algorithm calling method applicable to an embodiment of this application.

FIG. 4 is a schematic diagram of a system architecture of an algorithm calling method applicable to an embodiment of this application.

It should be understood that the system architecture shown in FIG. 4 may be located at the hardware abstraction layer 230 shown in FIG. 2.

As shown in FIG. 4, the system architecture 300 may include a 3A algorithm fusion module 310 (3A-Fusion) (an example of a fusion module), an input/output integration module 320 (3A-IO) (an example of an integration module), and a processor 330. The 3A algorithm fusion module 310 may be configured to call 3A algorithms in an original 3A algorithm library (an example of a first algorithm library) and a newly added 3A algorithm library (an example of a second algorithm library). For example, the 3A algorithm fusion module 310 may be configured to collaboratively call the 3A algorithms in the original 3A algorithm library and the newly added 3A algorithm library in an electronic device. The input/output integration module 320 may be configured to integrate running contexts of an auto focus algorithm, an auto exposure algorithm, and an auto white balance algorithm, and send input/output data to a corresponding algorithm. The processor 330 may be a CPU of the electronic device, and the processor may include a control module 331 (processor). The control module 331 is configured to control the 3A algorithm fusion module 310, so that the 3A algorithm fusion module 310 calls a corresponding 3A algorithm.

Optionally, the 3A algorithm fusion module 310 may collaboratively call algorithms in the original 3A algorithm library and the newly added 3A algorithm library. Different call policies are set based on different states of the electronic device, to call the algorithms in the original 3A algorithm library and the newly added 3A algorithm library.

For example, weight values of 3A algorithms in the newly added 3A algorithm library and the original 3A algorithm library may be configured based on a photographing status of the electronic device.

For example, the 3A algorithm fusion module 310 may determine a call policy based on an auto exposure state machine and/or an auto focus state machine.

In an example, when the electronic device is in a focusing state, a weight value of a newly added 3A algorithm may be a first weight value. When the electronic device is in a state in which focusing ends, a weight value of a newly added 3A algorithm may be a second weight value.

In other words, the newly added 3A algorithm and the original 3A algorithm may be collaboratively called based on different photographing statuses of the electronic device.

Optionally, the input/output integration module 320 may be configured to uniformly manage a running context of the newly added 3A algorithm library. The newly added 3A algorithm may obtain required data from the input/output integration module 320.

In an example, the system 300 may alternatively not include the input/output integration module 320, and may provide a running context for a newly added 3A algorithm by using an auto focus algorithm input/output, an auto exposure algorithm input/output, and an auto white balance algorithm input/output.

It should be understood that the input/output integration module 320 in the system 300 may make the system architecture more refined and make a function of each module single.

In this embodiment of this application, the newly added 3A algorithm library may be decoupled from the control module by using the system architecture shown in FIG. 4, so that when a new 3A algorithm is added to the electronic device, the control module does not need to be modified. In addition, the 3A algorithm fusion module may be used to flexibly call the newly added 3A algorithm library and the original 3A algorithm library.

Figure 5:
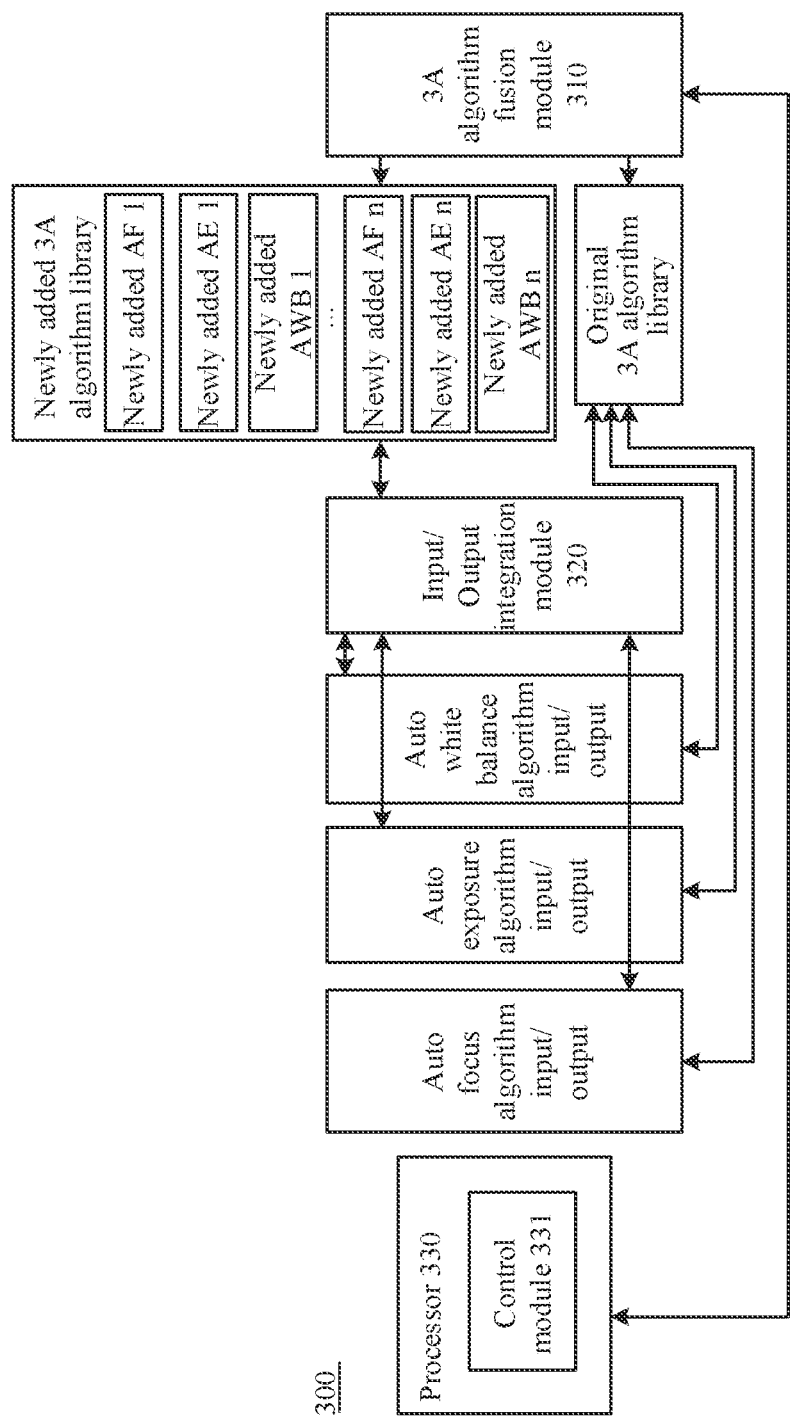
FIG. 5 is a schematic diagram of a system architecture of an algorithm calling method applicable to an embodiment of this application.

For example, as shown in FIG. 5, the electronic device includes a plurality of newly added 3A algorithms, and the plurality of newly added algorithms may include a newly added AF 1, a newly added AE 1, and a newly added AWB 1 to a newly added AF n, a newly added AE n, and a newly added AWB n, where n is a positive integer greater than 1. The newly added 3A algorithms may be separately stored in the newly added 3A algorithm library.

The following describes several implementations of the system architecture 300 in detail with reference to FIG. 6A and FIG. 6B to FIG. 9.

It should be noted that a 3A fusion algorithm shown in FIG. 6A and FIG. 6B to FIG. 9 may be an algorithm running in the 3A algorithm fusion module 310 shown in FIG. 4. The original 3A algorithm library (an example of a first algorithm library) in FIG. 4 may include an original auto focus algorithm, an original auto exposure algorithm, and an original auto white balance algorithm, and the newly added 3A algorithm library (an example of a second 3A algorithm library) may include a newly added auto focus algorithm, a newly added auto exposure algorithm, and a newly added auto white balance algorithm.

Implementation 1

Figure 6A:
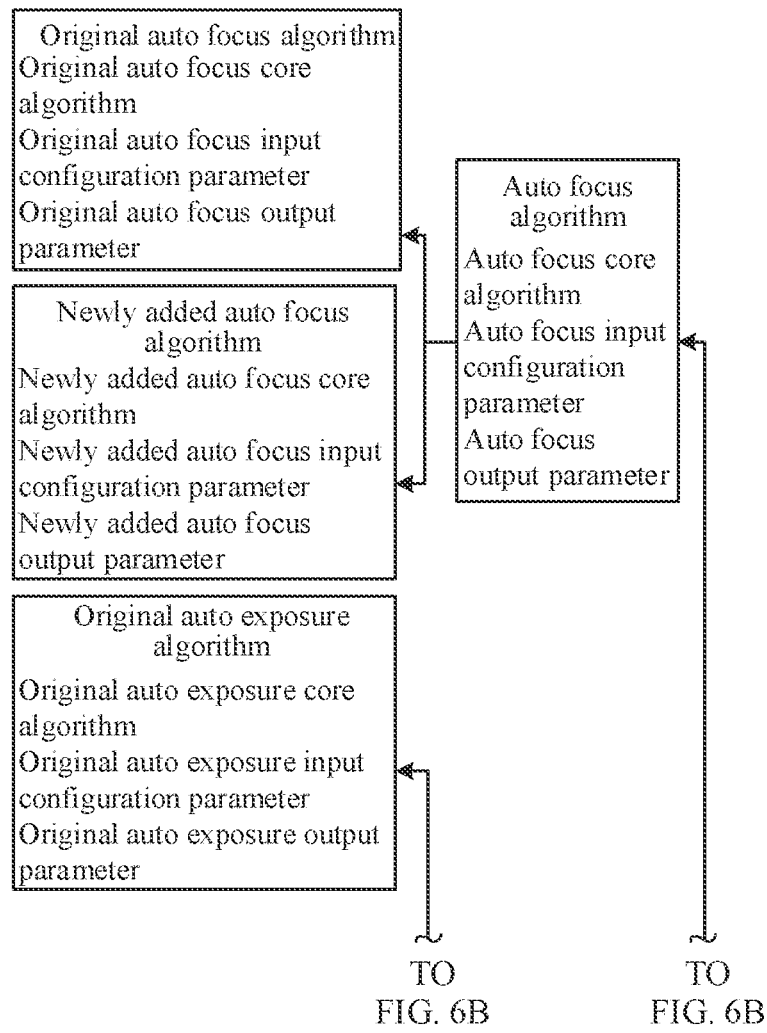
FIG. 6A and FIG. 6B are a schematic diagram of a system architecture of an algorithm calling method applicable to an embodiment of this application.
Figure 6B:
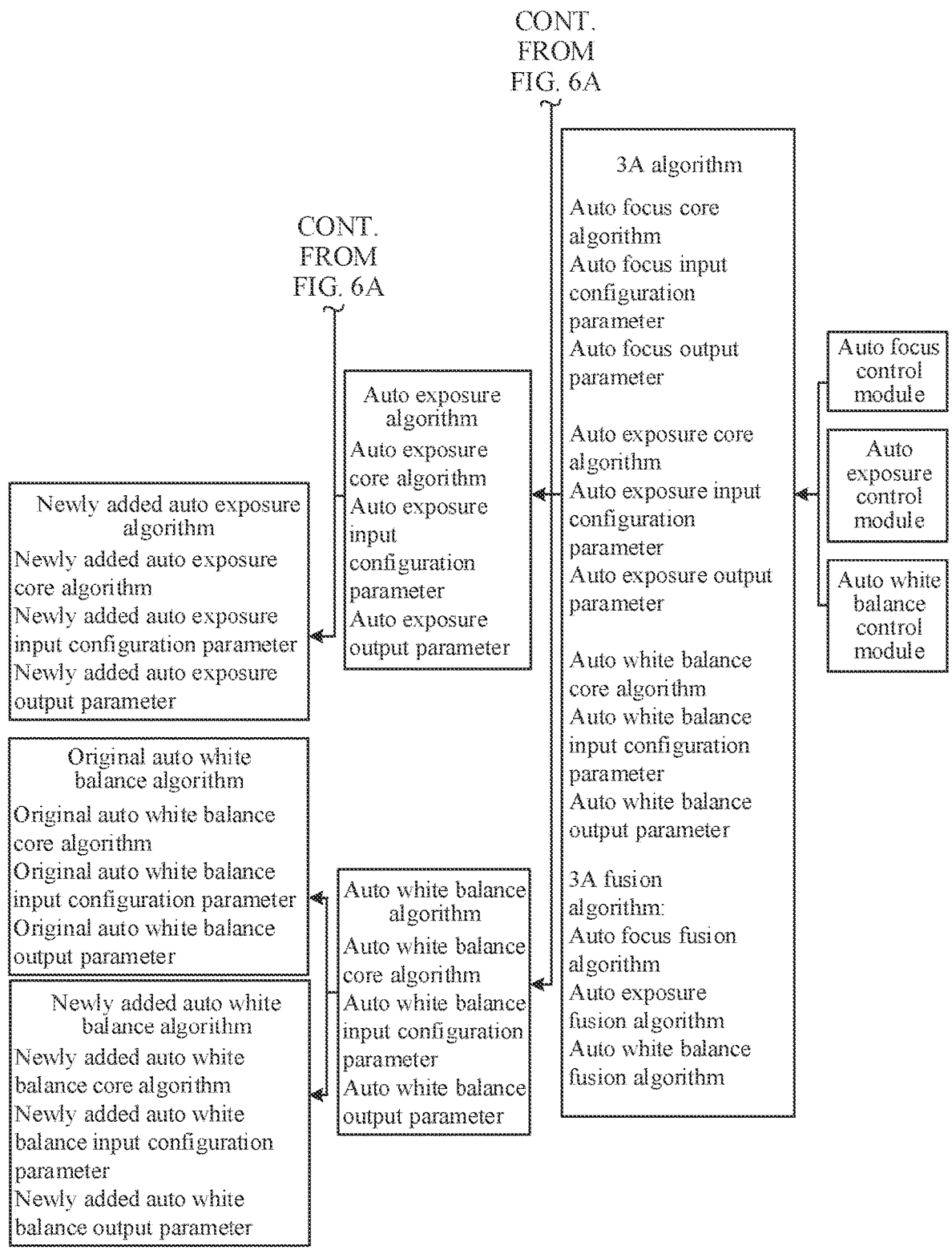

FIG. 6A and FIG. 6B show a system architecture of an algorithm calling method applicable to an embodiment of this application.

In an example, a 3A fusion algorithm (for example, the fusion module shown in FIG. 4) may be configured in a 3A algorithm, as shown in FIG. 6A and FIG. 6B. The 3A algorithm may refer to a module that stores a 3A algorithm.

As shown in FIG. 6A and FIG. 6B, control modules may include an auto focus control module, an auto exposure control module, and an auto white balance module. The control module may be configured to call a 3A algorithm. The 3A algorithm may include corresponding data of an auto focus algorithm, corresponding data of an auto exposure algorithm, and corresponding data of an auto white balance algorithm. The 3A algorithm obtains a corresponding call instruction of the control module, and delivers the instruction to a corresponding algorithm.

For example, the auto focus control module may send a first instruction to the 3A algorithm, and the first instruction is used to call the auto focus algorithm. The 3A fusion algorithm may obtain a current photographing status of an electronic device, determine a weight of an original auto focus algorithm and a weight of a newly added auto focus algorithm, and send a second instruction to an auto focus algorithm module. The auto focus algorithm calls the original auto focus algorithm and/or the newly added auto focus algorithm according to the second instruction, so that a corresponding auto focus algorithm runs.

In an example, the 3A fusion algorithm determines that a weight value of the original auto focus algorithm is 0 and a weight value of the newly added auto focus algorithm is 1. In this case, the auto focus algorithm may send the second instruction to the newly added auto focus algorithm.

In an example, the 3A fusion algorithm determines that a weight value of the original auto focus algorithm is 1 and a weight value of the newly added auto focus algorithm is 0. In this case, the auto focus algorithm may send the second instruction to the original auto focus algorithm.

In an example, the 3A fusion algorithm determines that a weight value of the original auto focus algorithm is 0.3 and a weight value of the newly added auto focus algorithm is 0.6. In this case, the auto focus algorithm may send the second instruction to the original auto focus algorithm and the newly added auto focus algorithm.

It should be understood that the foregoing is described by using an example, and no limitation is imposed on the weight value of the newly added 3A algorithm and the weight value of the original 3A algorithm.

For example, the auto focus algorithm is used as an example for description. The auto focus algorithm may include an auto focus core algorithm, an auto focus input configuration parameter (Set Param), and an auto focus output parameter (Get Param). When the auto focus algorithm is called, the input configuration parameter is first called to set a value of the input configuration parameter, and an operation is performed, according to algorithm logic of the auto focus core algorithm, on the input configuration parameter to which the value is assigned, to obtain a parameter value of the output parameter. For example, input configuration parameters are A, B, and C, and it is specified that A=1, B=2, and C=3. The auto focus core algorithm may be an addition operation, and an operation A+B+C=D is performed according to the auto focus core algorithm, where D represents an output parameter. According to A=1, B=2, and C=3, it is learned that A+B+C=6, and the output parameter D is assigned a value 6.

It should be understood that the foregoing is an example description of the auto focus core algorithm, the auto focus input configuration parameter (Set Param), and the auto focus output parameter (Get Param). The auto exposure algorithm and the auto white balance algorithm are similar to the auto focus algorithm. This application sets no limitation on specific data of execution logic and a parameter of another core algorithm.

Implementation 2

Figure 7:
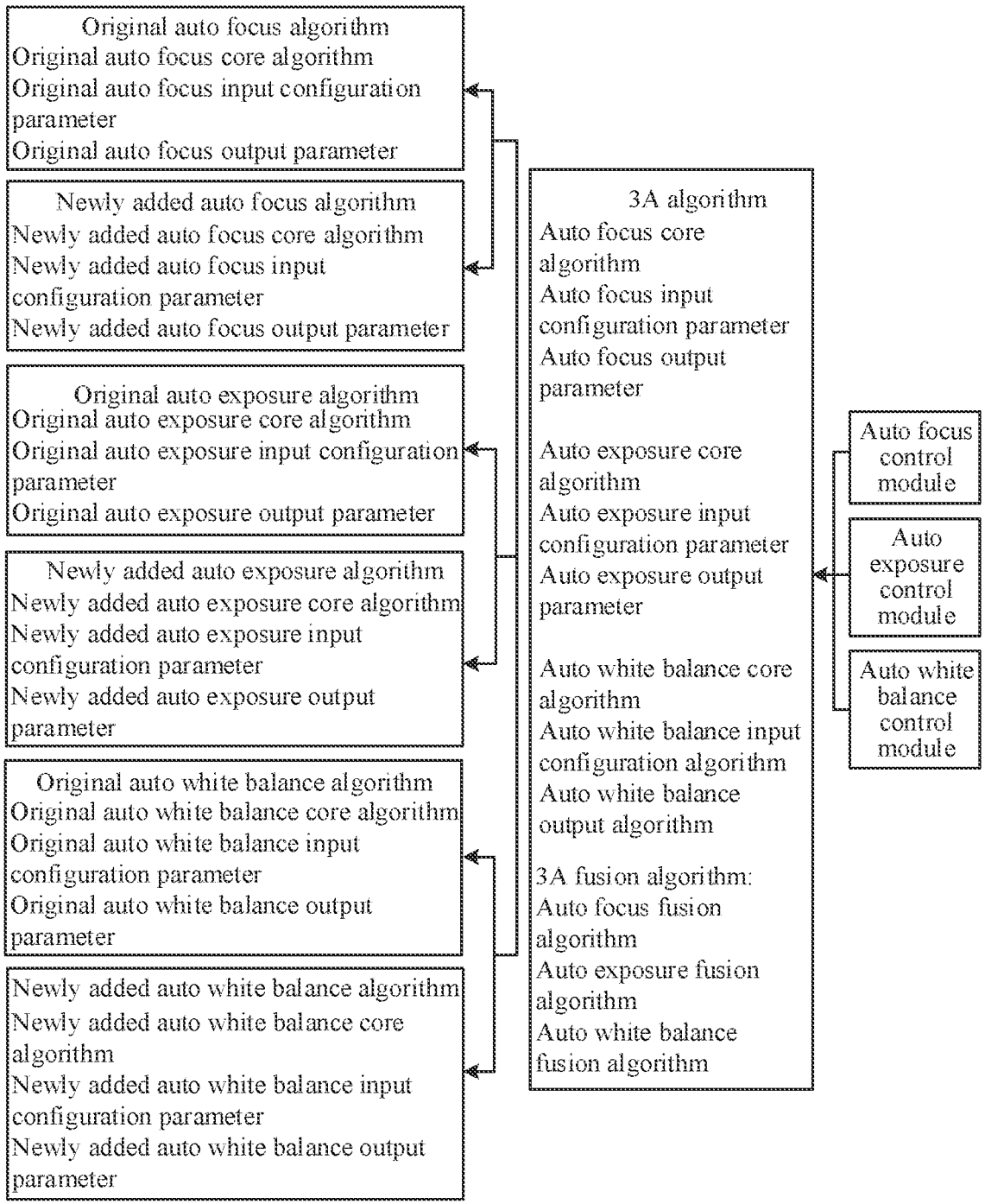
FIG. 7 is a schematic diagram of a system architecture of an algorithm calling method applicable to an embodiment of this application.

In an example, as shown in FIG. 7, a 3A fusion algorithm may be configured in a 3A algorithm. A control module may send a first instruction to a 3A algorithm module. The 3A fusion algorithm determines a call policy according to the first instruction and a photographing status of an electronic device, and sends a second instruction for calling an original 3A algorithm and a newly added 3A algorithm.

For example, an auto focus control module may send a first instruction to the 3A algorithm, and the first instruction is used to call an auto focus algorithm. The 3A fusion algorithm may obtain a current photographing status of the electronic device, and determine a weight of an original auto focus algorithm and a weight of a newly added auto focus algorithm. The 3A algorithm may send a second instruction to the original auto focus algorithm and/or the newly added auto focus algorithm based on the weights, so that a corresponding auto focus algorithm runs.

It should be understood that a difference between implementation 2 and implementation 1 lies in that in the system architecture shown in FIG. 7, the auto focus algorithm, the auto exposure algorithm, and the auto white balance algorithm are stored in the 3A algorithm together, and there may be no separate auto focus algorithm, auto exposure algorithm, and auto white balance algorithm. The original 3A algorithm and the newly added 3A algorithm are called by using the 3A algorithm.

Implementation 3

In an example, a 3A fusion algorithm may be set in each algorithm. For example, an auto focus fusion algorithm in the 3A fusion algorithm may be set in an auto focus algorithm, an auto exposure fusion algorithm in the 3A fusion algorithm may be set in an auto focus algorithm, and an auto white balance fusion algorithm in the 3A fusion algorithm may be set in an auto white balance algorithm, as shown in FIG. 8A and FIG. 8B.

Figure 8A:
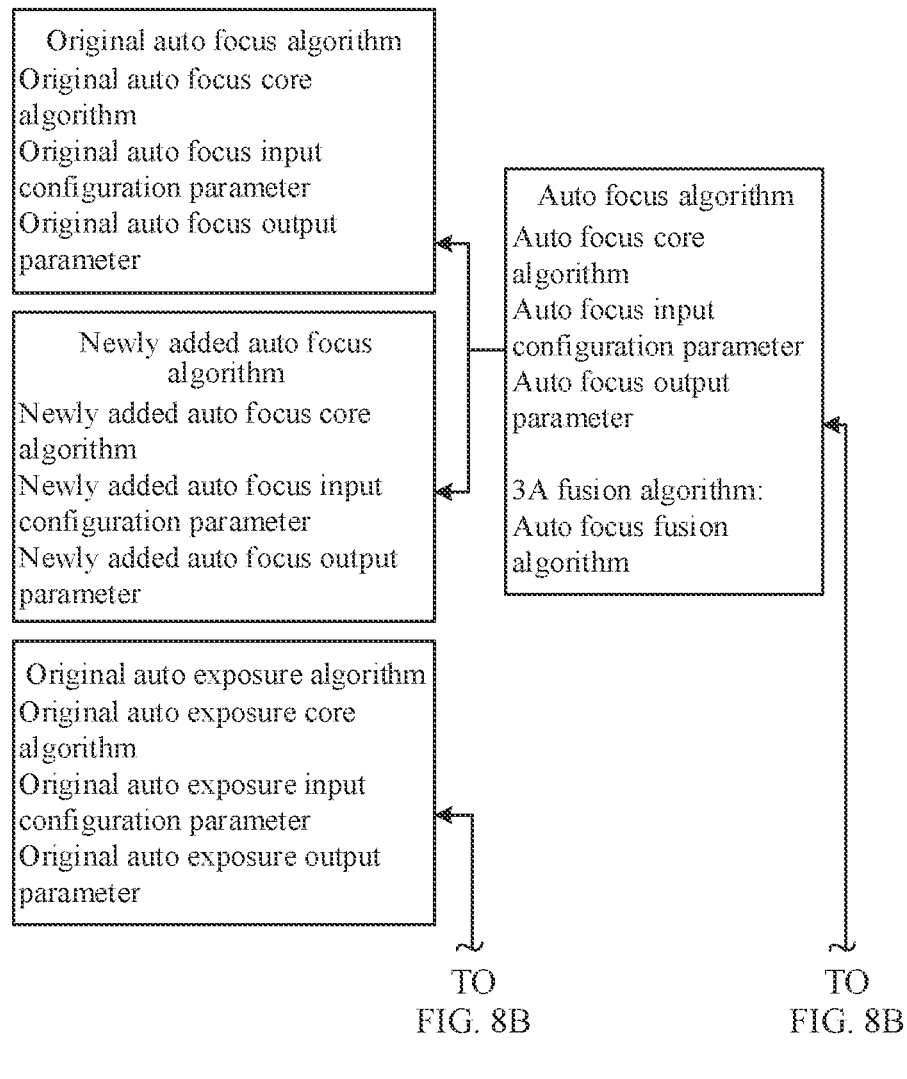
FIG. 8A and FIG. 8B are a schematic diagram of a system architecture of an algorithm calling method applicable to an embodiment of this application.
Figure 8B:
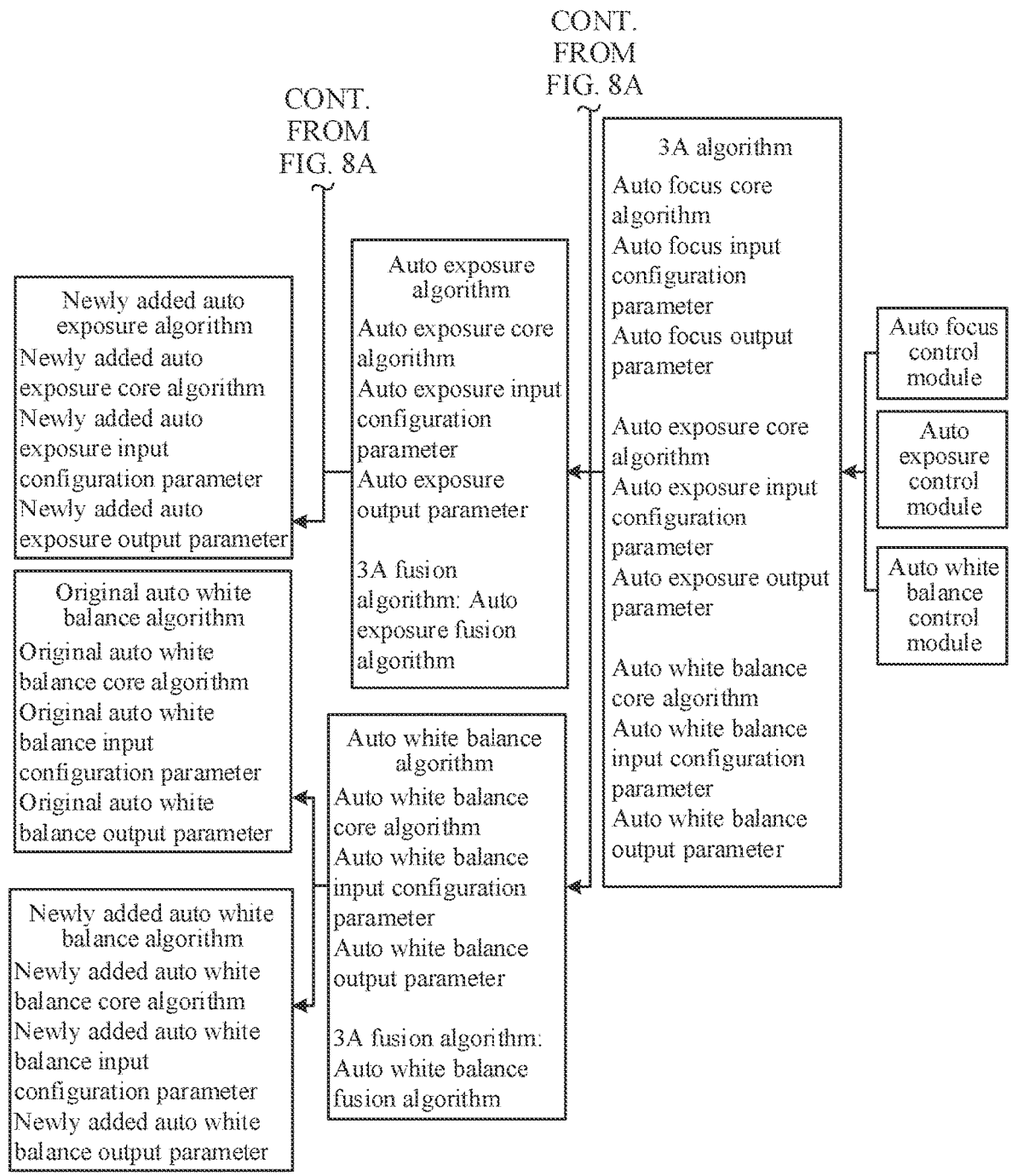

For example, as shown in FIG. 8A and FIG. 8B, an auto focus control module may send a first instruction to the 3A algorithm, and the first instruction is used to call the auto focus algorithm. The 3A algorithm transmits the first instruction to the auto focus algorithm, and the auto focus algorithm determines a weight of an original auto focus algorithm and a weight of a newly added auto focus algorithm based on a current photographing status of an electronic device and the auto focus fusion algorithm, and sends a second instruction to the original auto focus algorithm and/or the newly added auto focus algorithm based on the weights, so that a corresponding auto focus algorithm runs.

It should be understood that a difference between implementation 3 and implementation 1 lies in that the 3A fusion algorithm is configured in each algorithm of the 3A algorithm in implementation 3.

Implementation 4

Figure 9:
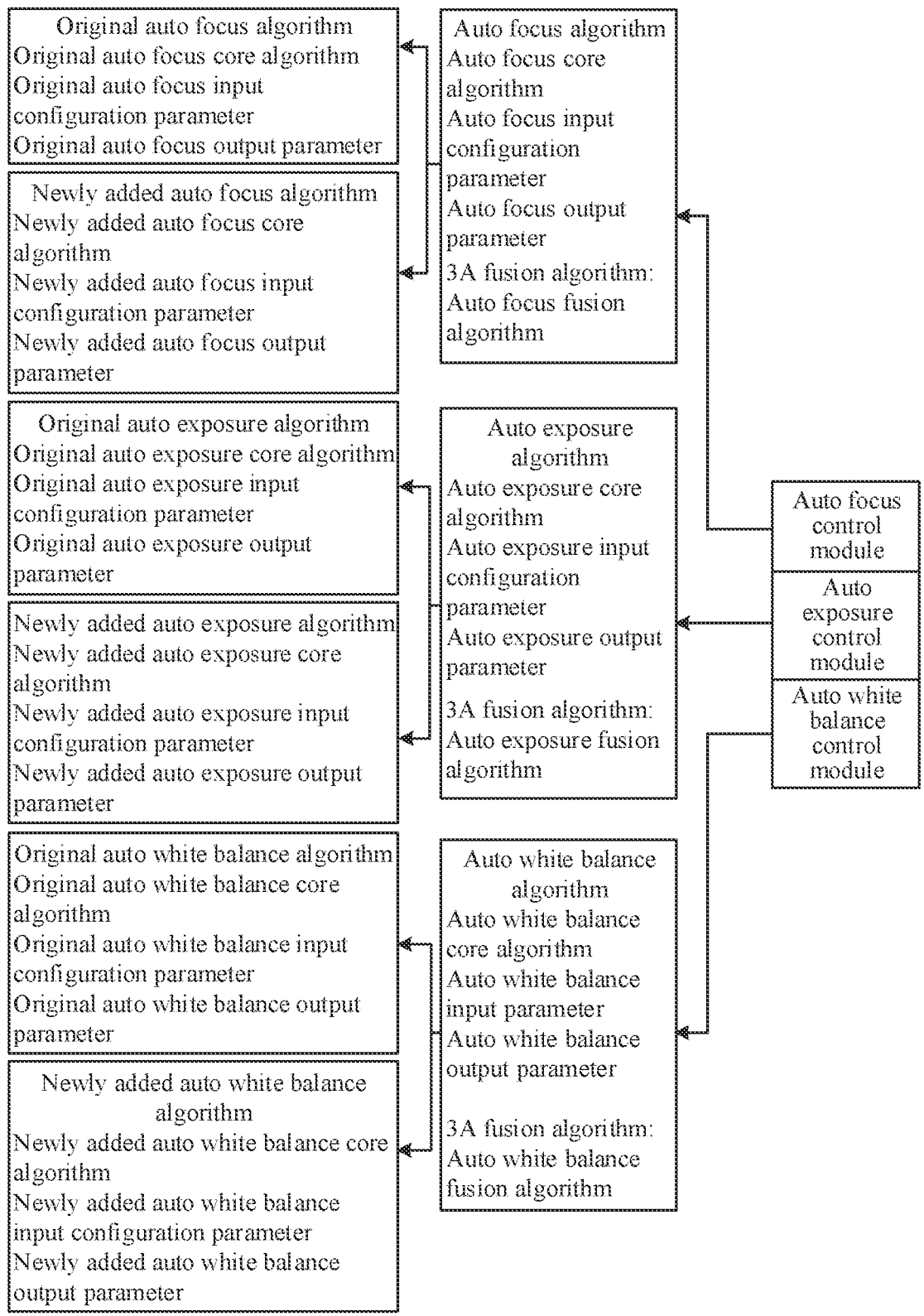
FIG. 9 is a schematic diagram of a system architecture of an algorithm calling method applicable to an embodiment of this application.

In an example, a system architecture may include a separate auto focus algorithm, auto exposure algorithm, and auto white balance algorithm. A 3A fusion algorithm is configured in each algorithm. A control module may send a first instruction to each algorithm. Each algorithm determines weights of an original 3A algorithm and a newly added 3A algorithm according to the first instruction and the 3A fusion algorithm, and collaboratively calls the original 3A algorithm and the newly added 3A algorithm, as shown in FIG. 9.

For example, an auto focus control module may send a first instruction to the 3A algorithm, and the first instruction is used to call an auto focus algorithm. An auto focus fusion algorithm in the 3A fusion algorithm may obtain a current photographing status of an electronic device, and determine a weight of an original auto focus algorithm and a weight of a newly added auto focus algorithm. The 3A algorithm may send a second instruction to the original auto focus algorithm and/or the newly added auto focus algorithm based on the weights, so that a corresponding auto focus algorithm runs.

It should be understood that a difference between implementation 4 and implementation 3 lies in that the system architecture shown in implementation 4 may not include the integral 3A algorithm, but include a separate auto focus algorithm, auto exposure algorithm, and auto white balance algorithm, and the 3A fusion algorithm is configured in each algorithm.

In embodiments of this application, when the system architecture shown in FIG. 4 to FIG. 9 is used to add a 3A algorithm to the electronic device, the newly added 3A algorithm may be stored in the newly added 3A algorithm library, and the newly added 3A algorithm does not need to be stored in the control module, so that the control module and the algorithm library can be decoupled, and maintenance efficiency of the electronic product is improved.

Figure 10:
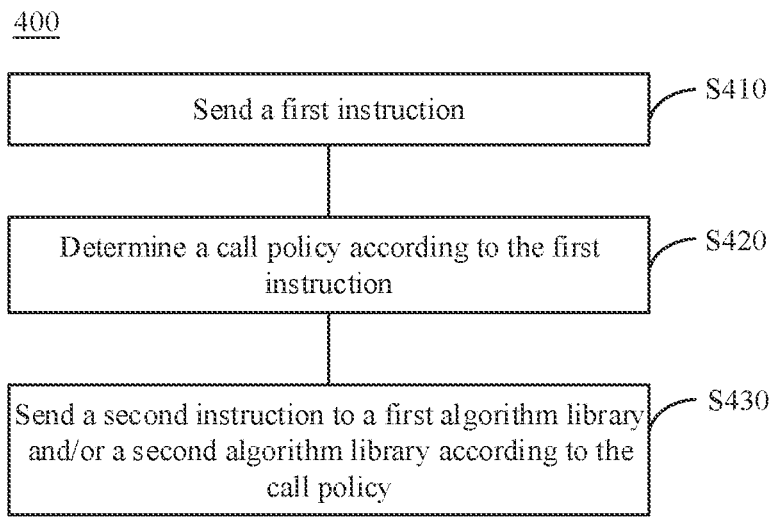
FIG. 10 is a schematic flowchart of an algorithm calling method according to an embodiment of this application.

FIG. 10 is a schematic flowchart of an algorithm calling method according to this application. The method 400 is applicable to the foregoing system architecture in FIG. 4 to FIG. 9. The method 400 includes step S410 to step S430. The following separately describes these steps in detail.

Step S410: Send a first instruction.

The first instruction is used to indicate a to-be-called target algorithm in an auto focus algorithm, an auto exposure algorithm, or an auto white balance algorithm.

For example, the first instruction may be a call instruction for the auto focus algorithm, that is, the target algorithm may be the auto focus algorithm. Alternatively, the first instruction may be a call instruction for the auto exposure algorithm, that is, the target algorithm may be the auto exposure algorithm. Alternatively, the first instruction is a call instruction for the auto white balance algorithm, that is, the target algorithm may be the auto white balance algorithm.

In an example, as shown in FIG. 4, the first instruction may be a 3A algorithm call instruction sent by the control module 331 to the 3A algorithm fusion module 310.

Step S420: Determine a call policy according to the first instruction.

The fusion policy is used to call an algorithm in a first algorithm library and/or a second algorithm library, the first algorithm library and the second algorithm library are configured to store different 3A algorithms, the first algorithm library and the second algorithm library are disposed in a camera algorithm library, and the camera algorithm library is disposed at a hardware abstraction layer, as shown in FIG. 2. The 3A algorithm may include an auto focus algorithm, an auto exposure algorithm, or an auto white balance algorithm.

In an example, as shown in FIG. 4, the first algorithm library may be an original 3A algorithm library, and the second algorithm library may be a newly added 3A algorithm library. After the 3A algorithm fusion module 310 receives the first instruction, the 3A algorithm fusion module 310 may collaboratively call an original 3A algorithm and a newly added 3A algorithm according to respective features of the original 3A algorithm and the newly added 3A algorithm.

Optionally, photographing status information may be obtained, and the photographing status information is used to indicate a photographing status of an electronic device. A call policy is determined according to the first instruction and the photographing status information.

Optionally, in a possible implementation, the target algorithm in the 3A algorithm may be determined according to the first instruction. For example, the target algorithm in the 3A algorithm may be any one of the auto focus algorithm, the auto exposure algorithm, or the auto white balance algorithm. A first weight value and a second weight value are determined based on the photographing status information of the electronic device, the first weight value is a weight value of the target algorithm in the first algorithm library, and the second weight value is a weight value of the target algorithm in the second algorithm library. Target algorithms in the first algorithm library and the second algorithm library may be collaboratively called based on the first weight value and the second weight value.

For example, for the auto focus algorithm, an AF state machine meeting a standard may be used as a top-layer control switch. For the auto exposure algorithm, an AE state machine meeting a standard may be used as a top-layer control switch.

In an example, the first algorithm library may be an original 3A algorithm library, and the second algorithm library may be a newly added 3A algorithm library. An auto focus algorithm included in the newly added 3A algorithm library is a first auto focus algorithm, and an auto focus algorithm included in the original 3A algorithm library is a second auto focus algorithm. When the photographing status information of the electronic device indicates that the electronic device is in a focusing state, a first weight value of the first auto focus algorithm and a second weight value of the second auto focus algorithm may be determined. Alternatively, when the photographing status information of the electronic device indicates that the electronic device is in a state in which focusing ends, a first weight value of the first auto focus algorithm and a second weight value of the second auto focus algorithm may be determined.

It should be understood that for different photographing statuses of the electronic device, there may be different first weight values and second weight values.

Step S430: Send a second instruction to the first algorithm library and/or the second algorithm library according to the call policy.

The second instruction is used to call an algorithm in the first algorithm library and the second algorithm library. The first algorithm library may be the original 3A algorithm library in FIG. 4 to FIG. 9. The second algorithm library may be the newly added 3A algorithm library in FIG. 4 to FIG. 9.

Optionally, the second algorithm library may obtain, by using an integration module, a context of running the target algorithm, and the integration module is configured to manage input/output data of the second algorithm library.

For example, as shown in FIG. 4, the newly added 3A algorithm library may be the second algorithm library, and the integration module may be the input/output integration module 320. The newly added 3A algorithm library may obtain a running context by using the input/output integration module 320, that is, obtain input/output data of a running algorithm.

In embodiments of this application, the control module may send the first instruction to the fusion module, and the first instruction is used to indicate the to-be-called target algorithm in the 3A algorithm. The fusion module may determine the call policy according to the first instruction, the fusion policy is used to call an algorithm in the first algorithm library and/or the second algorithm library, and the first algorithm library and the second algorithm library may be configured to store different 3A algorithms. The fusion module may send the second instruction to the first algorithm library and/or the second algorithm library according to the call policy, and the second instruction is used to call the target algorithm. In embodiments of this application, an original 3A algorithm of an electronic device may be stored in the first algorithm library, and a newly added 3A algorithm may be stored in the second algorithm library. The newly added 3A algorithm may be a self-developed 3A algorithm or an algorithm obtained by supplementing and enhancing the original 3A algorithm. Therefore, compared with the conventional technology, in embodiments of this application, when a 3A algorithm is newly added to the electronic device, the control module may not need to be modified, and the newly added 3A algorithm may be stored in the second algorithm library. This implements decoupling between the control module and the algorithm, and improves maintenance efficiency of the electronic device.

It should be understood that the terms "first" and "second" are merely used for description, but should not be understood as indicating or implying relative importance or implying a quantity of indicated technical features.

It should be further understood that the foregoing examples are intended to help a person skilled in the art understand embodiments of this application, and are not intended to limit embodiments of this application to a specific value or a specific scenario that is enumerated. A person skilled in the art may perform various equivalent modifications or changes according to the foregoing examples. Such modifications or changes also fall within the scope of embodiments of this application.

The foregoing describes in detail the algorithm calling method in embodiments of this application with reference to FIG. 1 to FIG. 10. The following describes apparatus embodiments of this application in detail with reference to FIG. 11 and FIG. 12. It should be understood that an apparatus in embodiments of this application may perform the foregoing methods in embodiments of this application. In other words, for a specific working process of the following products, refer to a corresponding process in the foregoing method embodiments.

Figure 11:
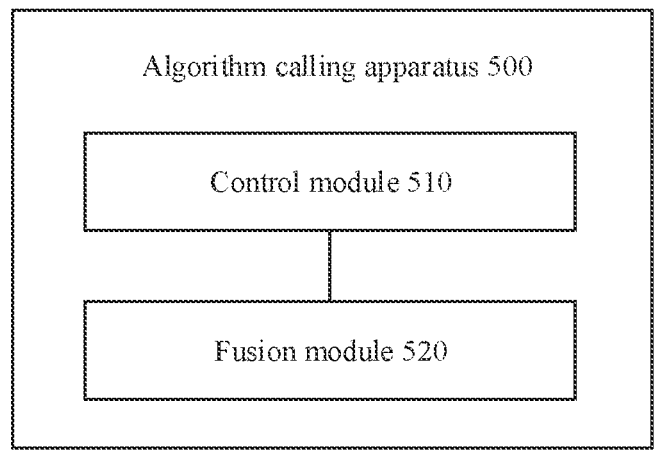
FIG. 11 is a schematic diagram of an algorithm calling apparatus according to an embodiment of this application.

FIG. 11 is a schematic diagram of a structure of an algorithm calling apparatus according to this application. The algorithm calling apparatus 500 includes a control module 510 and a fusion module 520.

The control module 510 is configured to send a first instruction to the fusion module 520, where the first instruction is used to indicate a to-be-called target algorithm in an auto focus algorithm, an auto exposure algorithm, or an auto white balance algorithm. The fusion module 520 is configured to: determine a fusion policy according to the first instruction, where the fusion policy is used to call an algorithm in a first algorithm library and/or a second algorithm library, the first algorithm library and the second algorithm library are configured to store different 3A algorithms, the first algorithm library and the second algorithm library are disposed in a camera algorithm library, the camera algorithm library is disposed at a hardware abstraction layer, and the 3A algorithm includes an auto focus algorithm, an auto exposure algorithm, or an auto white balance algorithm; and send a second instruction to the first algorithm library and/or the second algorithm library according to the fusion policy, where the second instruction is used to call the target algorithm.

Optionally, the fusion module 520 is configured to:
obtain photographing status information, where the photographing status information is used to indicate a photographing status of an electronic device; and
determine the call policy according to the first instruction and the photographing status information.

Optionally, the fusion module 520 is configured to:
determine a first weight value and a second weight value based on the photographing status information, where the first weight value is a weight value of the target algorithm in the first algorithm library, and the second weight value is a weight value of the target algorithm in the second algorithm library.

Optionally, the photographing status information includes status information of auto focus and status information of auto exposure.

Optionally, the status information of the auto focus includes that auto focus is being performed or auto focus ends.

Optionally, the status information of the auto exposure includes that auto exposure is being performed or auto exposure ends.

Optionally, the second algorithm library obtains, by using an integration module, a context of running the target algorithm, and the integration module is configured to manage input/output data of the second algorithm library.

It should be noted that the foregoing algorithm calling apparatus 500 is embodied in a form of a functional module. The term "module" herein may be implemented in a form of software and/or hardware. This is not specifically limited.

For example, the "module" may be a software program, a hardware circuit, or a combination thereof that implements the foregoing functions. The hardware circuit may include an application-specific integrated circuit (application-specific integrated circuit, ASIC), an electronic circuit, a memory and a processor (such as a shared processor, a dedicated processor, or a group of processors) configured to execute one or more software or firmware programs, a combined logic circuit, and/or another suitable component that supports the described function. Therefore, the example units described in embodiments of this application can be implemented by using electronic hardware or a combination of computer software and electronic hardware. Whether the functions are implemented by hardware or software depends on specific applications and design constraints of the technical solutions. A person skilled in the art may use different methods for each specific application to implement the described functions, but this implementation should not be considered to be beyond the scope of this application.

Figure 12:
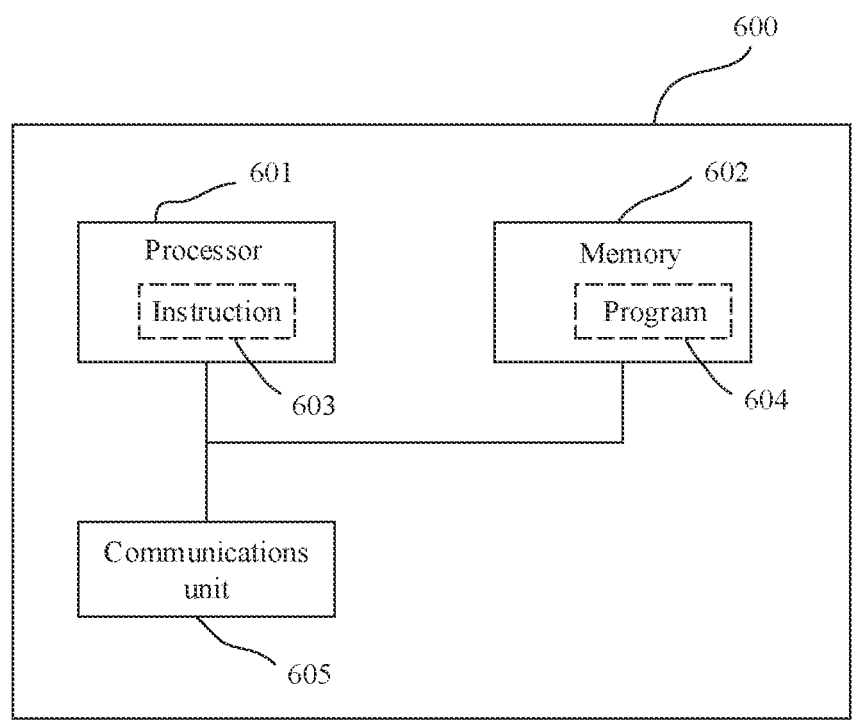
FIG. 12 is a schematic diagram of an electronic device according to an embodiment of this application.

FIG. 12 is a schematic diagram of a structure of an electronic device according to this application. A dashed line in FIG. 12 indicates that the unit or the module is optional. The electronic device 600 may be configured to implement the algorithm calling method described in the foregoing method embodiments.

The electronic device 600 includes one or more processors 601, and the one or more processors 601 may support the electronic device 600 in implementing the algorithm calling method in the method embodiments. The processor 601 may be a general-purpose processor or a dedicated processor. For example, the processor 601 may be a central processing unit (central processing unit, CPU), a digital signal processor (digital signal processor, DSP), an application-specific integrated circuit (application-specific integrated circuit, ASIC), a field programmable gate array (field programmable gate array, FPGA), or another programmable logic device, such as a discrete gate, a transistor logic device, or a discrete hardware component.

The processor 601 may be configured to control the electronic device 600, execute a software program, and process data of the software program. The electronic device 600 may further include a communications unit 605, configured to implement signal input (receiving) and output (sending).

For example, the electronic device 600 may be a chip, the communications unit 605 may be an input and/or output circuit of the chip, or the communications unit 605 may be a communications interface of the chip, and the chip may be used as a part of a terminal device or another electronic device.

For another example, the electronic device 600 may be a terminal device, and the communications unit 605 may be a transceiver of the terminal device, or the communications unit 605 may be a transceiver circuit of the terminal device.

The electronic device 600 may include one or more memories 602, storing a program 604. The program 604 may be run by the processor 601 to generate an instruction 603, so that the processor 601 performs the algorithm calling method in the foregoing method embodiments according to the instruction 603.

Optionally, the memory 602 may further store data. Optionally, the processor 601 may further read the data stored in the memory 602, where the data may be stored in a same storage address as the program 604, or the data may be stored in a different storage address from the program 604.

The processor 601 and the memory 602 may be disposed separately, or may be integrated together, for example, integrated onto a system on a chip (system on a chip, SOC) of a terminal device.

For example, the memory 602 may be configured to store a related program 604 of the algorithm calling method provided in embodiments of this application, and when performing a 3A algorithm, the processor 601 may be configured to invoke the related program 604 of the algorithm calling method that is stored in the memory 602, to perform the algorithm calling method in embodiments of this application, such as: sending a first instruction, where the first instruction is used to indicate a to-be-called target algorithm in an auto focus algorithm, an auto exposure algorithm, or an auto white balance algorithm; determining a fusion policy according to the first instruction, where the fusion policy is used to call an algorithm in a first algorithm library and/or a second algorithm library, the first algorithm library and the second algorithm library are configured to store different 3A algorithms, the first algorithm library and the second algorithm library are disposed in a camera algorithm library, the camera algorithm library is disposed at a hardware abstraction layer, and the 3A algorithm includes an auto focus algorithm, an auto exposure algorithm, or an auto white balance algorithm; and sending a second instruction to the first algorithm library and/or the second algorithm library according to the fusion policy, where the second instruction is used to call the target algorithm.

This application further provides a computer program product. When the computer program product is executed by the processor 601, the algorithm calling method in any method embodiment of this application is implemented.

The computer program product may be stored in the memory 602, for example, may be the program 604. The program 604 undergoes processing processes such as preprocessing, compilation, assembly, and link, and is finally converted into an executable target file that can be executed by the processor 601.

This application further provides a computer-readable storage medium, storing a computer program. When the computer program is executed by a computer, the algorithm calling method in any method embodiment of this application is implemented. The computer program may be a high-level language program, or may be an executable target program.

Optionally, the computer-readable storage medium is, for example, the memory 602. The memory 602 may be a volatile memory or a non-volatile memory, or the memory 602 may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), which serves as an external cache. By way of example and not limitation, many forms of RAMs are available, such as a static random access memory (static RAM, SRAM), a dynamic random access memory (dynamic RAM, DRAM), a synchronous dynamic random access memory (synchronous DRAM, SDRAM), double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It may be clearly understood by a person skilled in the art that, for convenience and brevity of description, for a specific working process and an achieved technical effect of the foregoing described apparatus and device, refer to a corresponding process and technical effect in the foregoing method embodiments, and details are not described herein again.

In the several embodiments provided in this application, the disclosed system, apparatus, and method may be implemented in other manners. For example, some features of the method embodiments described above may be ignored or not performed. The described apparatus embodiments are merely examples. Division into the units is merely logical function division. In actual implementation, there may be another division manner. A plurality of units or components may be combined or integrated into another system. In addition, a coupling between units or a coupling between components may be a direct coupling, or may be an indirect coupling. The coupling includes an electrical, mechanical, or another form of connection.

It should be understood that in embodiments of this application, sequence numbers of processes do not mean a sequence of execution. The sequence of execution of the processes should be determined according to functions and internal logic of the processes, and should not constitute any limitation on an implementation process of embodiments of this application.

In addition, the terms "system" and "network" are usually used interchangeably in this specification. The term "and/or" in this specification is merely an association relationship of associated objects, and indicates that three relationships may exist. For example, A and/or B may indicate the following three cases: Only A exists, both A and B exist, and only B exists. In addition, the character "/" in this specification usually indicates an "or" relationship between the associated objects.

In conclusion, the foregoing descriptions are merely example embodiments of the technical solutions of this application, and are not intended to limit the protection scope of this application. Any modification, equivalent replacement, or improvement made without departing from the spirit and principle of this application should fall within the protection scope of this application.

What is claimed is:

1. An algorithm calling method; wherein the algorithm calling method is applied to a system architecture, the system architecture comprises a first algorithm library, a second algorithm library, a control module, and a fusion module, the first algorithm library and the second algorithm library are configured to store different 3A algorithms, the first algorithm library and the second algorithm library are disposed in a camera algorithm library, the camera algorithm library is disposed at a hardware abstraction layer, the 3A algorithm comprises an auto focus algorithm, an auto exposure algorithm, or an auto white balance algorithm, the control module is configured to call any one of the auto focus algorithm, the auto exposure algorithm, or the auto white balance algorithm, the fusion module is configured to call an algorithm in the first algorithm library and/or the second algorithm library, and the algorithm calling method comprises:

sending, by the control module, a first instruction to the fusion module, wherein the first instruction is used to indicate a to-be-called target algorithm in the auto focus algorithm, the auto exposure algorithm, or the auto white balance algorithm;

obtaining, by the fusion module, photographing status information indicating a photographing status of an electronic device;

determining, by the fusion module, a fusion policy according to the first instruction and the photographing status information, wherein the fusion policy is used to call an algorithm in the first algorithm library and/or the second algorithm library, and wherein determining the fusion policy according to the first instruction and the photographing status information comprises:
  determining, by the fusion module, a first weight value and a second weight value based on the photographing status information, wherein the first weight value is a weight value of the target algorithm in the first algorithm library, and the second weight value is a weight value of the target algorithm in the second algorithm library; and
  sending, by the fusion module, a second instruction to the first algorithm library and/or the second algorithm library according to the fusion policy, wherein the second instruction is used to call the target algorithm.

2. The algorithm calling method according to claim 1, wherein the photographing status information comprises status information of auto focus and status information of auto exposure.

3. The algorithm calling method according to claim 2, wherein the status information of the auto focus comprises that auto focus is being performed or auto focus ends.

4. The algorithm calling method according to claim 2, wherein the status information of the auto exposure comprises that auto exposure is being performed or auto exposure ends.

5. The algorithm calling method according to claim 1, wherein the second algorithm library obtains, by using an integration module, a context of running the target algorithm, and the integration module is configured to manage input/output data of the second algorithm library.

6. The algorithm calling method according to claim 1, wherein the photographing status information comprises status information of auto focus and status information of auto exposure.

7. An electronic device, comprising:
  one or more processors and one or more memories, wherein the one or more memories are coupled to the one or more processors, the one or more memories are configured to store computer program code, the computer program code comprises computer instructions, and when executing the computer instructions, the electronic device is enabled to perform the following steps:
  sending, a first instruction to a fusion module, wherein the first instruction is used to indicate a to-be-called target algorithm in the auto focus algorithm, the auto exposure algorithm, or the auto white balance algorithm;
  obtaining, photographing status information indicating a photographing status of an electronic device;
  determining, a fusion policy according to the first instruction and the photographing status information, wherein the fusion policy is used to call an algorithm in the first algorithm library and/or the second algorithm library, and wherein determining the fusion policy according to the first instruction and the photographing status information comprises:
    determining, a first weight value and a second weight value based on the photographing status information, wherein the first weight value is a weight value of the target algorithm in the first algorithm library, and the second weight value is a weight value of the target algorithm in the second algorithm library; and
  sending, by the fusion module, a second instruction to the first algorithm library and/or the second algorithm library according to the fusion policy, wherein the second instruction is used to call the target algorithm;
  wherein the first algorithm library and the second algorithm library are configured to store different 3A algorithms, the first algorithm library and the second algorithm library are disposed in a camera algorithm library, the camera algorithm library is disposed at a hardware abstraction layer, the 3A algorithm comprises an auto focus algorithm, an auto exposure algorithm, or an auto white balance algorithm.

8. The electronic device according to claim 7, wherein the photographing status information comprises status information of auto focus and status information of auto exposure.

9. The electronic device according to claim 8, wherein the status information of the auto focus comprises that auto focus is being performed or auto focus ends.

10. The electronic device according to claim 8, wherein the status information of the auto exposure comprises that auto exposure is being performed or auto exposure ends.

11. The electronic device according to claim 7, wherein the photographing status information comprises status information of auto focus and status information of auto exposure.

12. The electronic device according to claim 7, wherein the second algorithm library obtains, by using an integration module, a context of running the target algorithm, and the integration module is configured to manage input/output data of the second algorithm library.

13. A non-transitory computer-readable storage medium comprising instructions, wherein when an electronic device runs the instructions, a electronic device is enabled to perform the following steps:
  sending, a first instruction to a fusion module, wherein the first instruction is used to indicate a to-be-called target algorithm in the auto focus algorithm, the auto exposure algorithm, or the auto white balance algorithm;
  obtaining, photographing status information indicating a photographing status of an electronic device;
  determining, a fusion policy according to the first instruction and the photographing status information, wherein the fusion policy is used to call an algorithm in the first algorithm library and/or the second algorithm library, and wherein determining the fusion policy according to the first instruction and the photographing status information comprises:
    determining, a first weight value and a second weight value based on the photographing status information, wherein the first weight value is a weight value of the target algorithm in the first algorithm library, and the second weight value is a weight value of the target algorithm in the second algorithm library; and
  sending, a second instruction to the first algorithm library and/or the second algorithm library according to the fusion policy, wherein the second instruction is used to call the target algorithm;
  wherein the first algorithm library and the second algorithm library are configured to store different 3A algorithms, the first algorithm library and the second algorithm library are disposed in a camera algorithm library, the camera algorithm library is disposed at a hardware abstraction layer, the 3A algorithm comprises an auto focus algorithm, an auto exposure algorithm, or an auto white balance algorithm.

14. The non-transitory computer-readable storage medium according to claim 13, wherein the photographing status information comprises status information of auto focus and status information of auto exposure.

* * * * *